United States Patent
Harrison

(10) Patent No.: US 12,255,554 B2
(45) Date of Patent: Mar. 18, 2025

(54) BOOTSTRAP START-UP CIRCUIT FOR MICROINVERTER

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 266 days.

(21) Appl. No.: 17/979,210

(22) Filed: Nov. 2, 2022

(65) Prior Publication Data

US 2023/0155521 A1    May 18, 2023

Related U.S. Application Data

(60) Provisional application No. 63/279,435, filed on Nov. 15, 2021.

(51) Int. Cl.
*H02M 7/797* (2006.01)
*H02M 1/00* (2006.01)
*H02M 1/08* (2006.01)
*H02M 1/36* (2007.01)

(52) U.S. Cl.
CPC ......... *H02M 7/797* (2013.01); *H02M 1/0006* (2021.05); *H02M 1/08* (2013.01); *H02M 1/36* (2013.01)

(58) Field of Classification Search
CPC ...... H02M 1/36; H02M 1/0006; H02M 7/797; H02M 1/08; H02J 3/381; H02J 13/00006
See application file for complete search history.

(56) References Cited

U.S. PATENT DOCUMENTS

| | | | |
|---|---|---|---|
| 5,581,171 A * | 12/1996 | Kerfoot | B60L 53/20 320/137 |
| 2005/0040711 A1* | 2/2005 | West | H02M 1/10 361/18 |
| 2015/0109827 A1 | 4/2015 | Poshtkouhi et al. | |
| 2015/0168473 A1 | 6/2015 | Fornage et al. | |
| 2016/0211841 A1 | 7/2016 | Harrison | |

FOREIGN PATENT DOCUMENTS

| | | |
|---|---|---|
| JP | 08-308247 A | 11/1996 |
| KR | 10-2018-0112361 A | 10/2018 |

OTHER PUBLICATIONS

PCT International Search Report and Written Opinion for Application No. PCT/US2022/048765 dated Mar. 13, 2023, 11 pgs.

\* cited by examiner

*Primary Examiner* — Harry R Behm
(74) *Attorney, Agent, or Firm* — Moser Taboada

(57) ABSTRACT

A microinverter is provided herein and comprises DC side MOSFETs connected to an input side of the microinverter, AC side MOSFETs connected to an output of the microinverter, and a plurality of gate drivers connected to the AC side MOSFETs and configured to automatically drive the microinverter without a DC voltage being applied to the input side of the microinverter.

14 Claims, 3 Drawing Sheets

BOOTSTRAP START-UP CIRCUIT FOR MICROINVERTER

CROSS-REFERENCE TO RELATED APPLICATIONS

The present application claims the benefit of and priority to U.S. Provisional Patent Application Ser. No. 63/279,435, filed Nov. 15, 2021, the entire contents of which is incorporated herein by reference.

BACKGROUND

Field of the Disclosure

Embodiments of the present disclosure relate generally to methods and apparatus configured for use with microinverters, and for example, to methods and apparatus that use bootstrap start-up circuits for microinverters.

Description of the Related Art

Distributed energy resources are known. Distributed energy resources can include one or more photovoltaics (PVs) (solar panels). In some instances, a DC input is sometimes required to provide power to the one or more PVs, e.g., start-up at nighttime to provide grid support functions. Similarly, a DC input is sometimes required to provide power to a battery storage microinverter to start-up an AC battery (e.g., single-phase or three-phase) of the battery storage, e.g., when the AC battery is completely discharged. In such instances, the existing AC battery, typically, requires a separate AC:DC converter to enable a start-up of the microinverters if the AC battery is completely discharged.

Therefore, the inventors have provided herein improved methods and apparatus that use bootstrap start-up circuits for microinverters.

SUMMARY

Methods and apparatus configured for use with bootstrap start-up circuits for microinverters are provided herein. For example, a microinverter comprises DC side MOSFETs connected to an input side of the microinverter, AC side MOSFETs connected to an output of the microinverter, and a plurality of gate drivers connected to the AC side MOSFETs and configured to automatically drive the microinverter without a DC voltage being applied to the input side of the microinverter.

In accordance with at least some embodiments, a method for providing power to a microinverter comprises detecting an input signal at a main control ASIC to drive isolated gate drivers, determining a voltage across AC side MOSFETs, alternately switching gate drivers of the AC side MOSFETs for driving the voltage into an AC side of a main isolation transformer, and rectifying the voltage to charge up a DC side input capacitor to power up a from a DC voltage present across the DC side input capacitor.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure generally relate to methods and apparatus that use bootstrap start-up circuits for microinverters. For example, a microinverter can comprise DC side MOSFETs connected to an input side of the microinverter. AC side MOSFETs can be connected to an output of the microinverter, and a plurality of gate drivers can be connected to the AC side MOSFETs and configured to automatically drive the microinverter without a DC voltage being applied to the input side of the microinverter. The methods and apparatus described herein provide an efficient and cost effective manner for starting a fully discharged microinverter without the need of a separate AC:DC converter.

Figure 1:
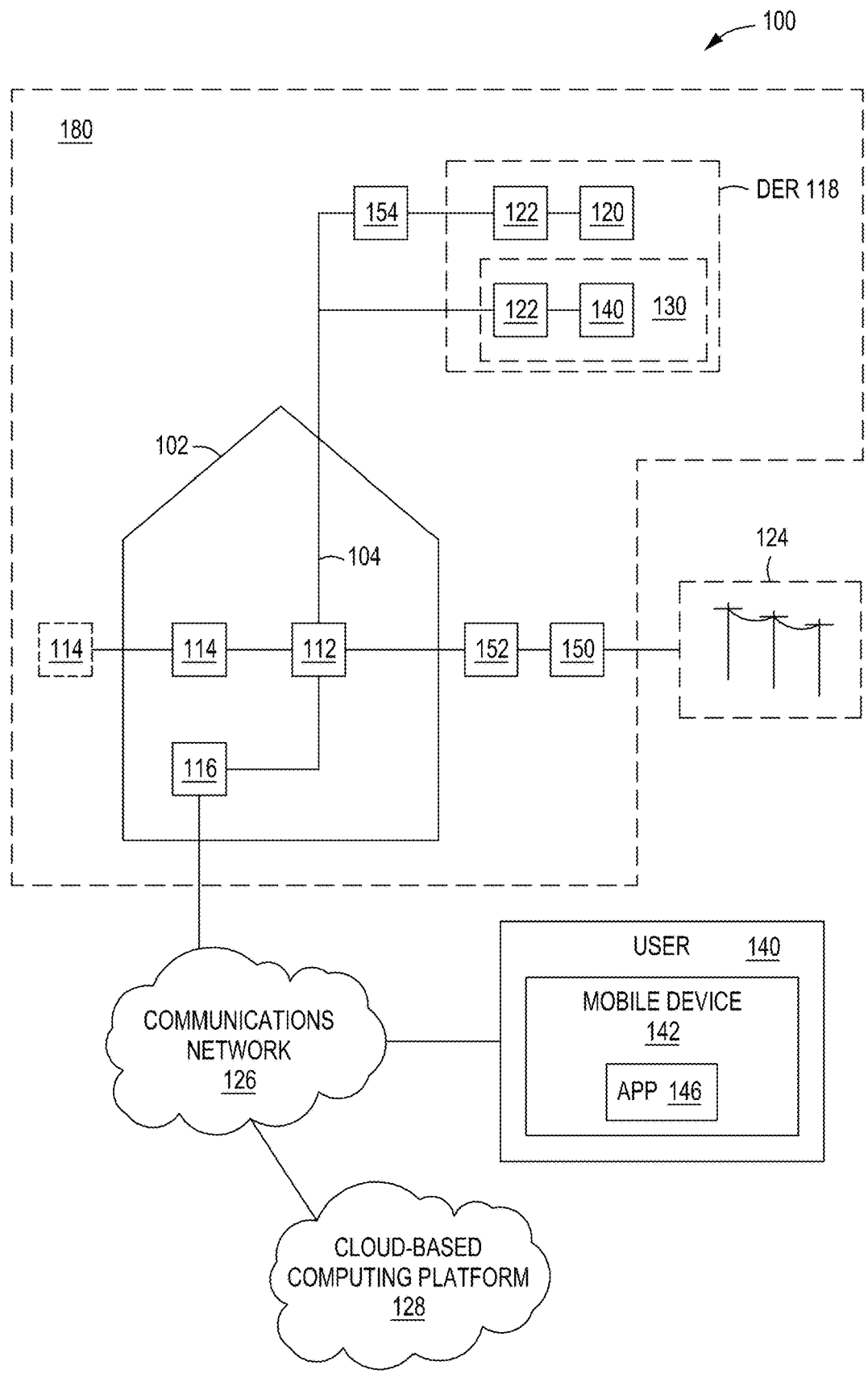
FIG. 1 is a block diagram of a power conversion system, in accordance with one or more embodiments of the present disclosure.

FIG. 1 is a block diagram of a system 100 (e.g., power conversion system) in accordance with one or more embodiments of the present disclosure. The diagram of FIG. 1 only portrays one variation of the myriad of possible system configurations. The present disclosure can function in a variety of environments and systems.

The system 100 comprises a structure 102 (e.g., a user's structure), such as a residential home or commercial building, having an associated DER 118 (distributed energy resource). The DER 118 is situated external to the structure 102. For example, the DER 118 may be located on the roof of the structure 102 or can be part of a solar farm. The structure 102 comprises one or more loads and/or energy storage devices 114 (e.g., appliances, electric hot water heaters, thermostats/detectors, boilers, water pumps, and the like), which can be located within or outside the structure 102, and a DER controller 116, each coupled to a load center 112. Although the energy storage devices 114, the DER controller 116, and the load center 112 are depicted as being located within the structure 102, one or more of these may be located external to the structure 102.

The load center 112 is coupled to the DER 118 by an AC bus 104 and is further coupled, via a meter 152 and a MID 150 (microgrid interconnect device), to a grid 124 (e.g., a commercial/utility power grid). The structure 102, the energy storage devices 114, DER controller 116, DER 118, load center 112, generation meter 154, meter 152, and MID 150 are part of a microgrid 180. It should be noted that one or more additional devices not shown in FIG. 1 may be part of the microgrid 180. For example, a power meter or similar device may be coupled to the load center 112.

The DER 118 comprises at least one renewable energy source (RES) coupled to power conditioners 122 (microinverters). For example, the DER 118 may comprise a plurality of RESs 120 coupled to a plurality of power conditioners 122 in a one-to-one correspondence (or two-to-one). In embodiments described herein, each RES of the plurality of RESs 120 is a photovoltaic module (PV module), although in other embodiments the plurality of RESs 120 may be any type of system for generating DC power from a renewable form of energy, such as wind, hydro, and the like. The DER 118 may further comprise one or more batteries (or other types of energy storage/delivery devices) coupled to the power conditioners 122 in a one-to-one correspondence, where each pair of power conditioner 122 and a battery 141 may be referred to as an AC battery 130.

The power conditioners 122 invert the generated DC power from the plurality of RESs 120 and/or the battery 141 to AC power that is grid-compliant and couple the generated AC power to the grid 124 via the load center 112. The generated AC power may be additionally or alternatively coupled via the load center 112 to the one or more loads (e.g., a solar pump) and/or the energy storage devices 114. In addition, the power conditioners 122 that are coupled to the batteries 141 convert AC power from the AC bus 104 to DC power for charging the batteries 141. A generation meter 154 is coupled at the output of the power conditioners 122 that are coupled to the plurality of RESs 120 in order to measure generated power.

In some alternative embodiments, the power conditioners 122 may be AC-AC converters that receive AC input and convert one type of AC power to another type of AC power. In other alternative embodiments, the power conditioners 122 may be DC-DC converters that convert one type of DC power to another type of DC power. In some of embodiments, the DC-DC converters may be coupled to a main DC-AC inverter for inverting the generated DC output to an AC output.

The power conditioners 122 may communicate with one another and with the DER controller 116 using power line communication (PLC), although additionally and/or alternatively other types of wired and/or wireless communication may be used. The DER controller 116 may provide operative control of the DER 118 and/or receive data or information from the DER 118. For example, the DER controller 116 may be a gateway that receives data (e.g., alarms, messages, operating data, performance data, and the like) from the power conditioners 122 and communicates the data and/or other information via the communications network 126 to a cloud-based computing platform 128, which can be configured to execute one or more application software, e.g., a grid connectivity control application, to a remote device or system such as a master controller (not shown), and the like. The DER controller 116 may also send control signals to the power conditioners 122, such as control signals generated by the DER controller 116 or received from a remote device or the cloud-based computing platform 128. The DER controller 116 may be communicably coupled to the communications network 126 via wired and/or wireless techniques. For example, the DER controller 116 may be wirelessly coupled to the communications network 126 via a commercially available router. In one or more embodiments, the DER controller 116 comprises an application-specific integrated circuit (ASIC) or microprocessor along with suitable software (e.g., a grid connectivity control application) for performing one or more of the functions described herein. For example, the DER controller 116 can include a memory (e.g., a non-transitory computer readable storage medium) having stored thereon instructions that when executed by a processor perform a method for grid connectivity control, as described in greater detail below.

The generation meter 154 (which may also be referred to as a production meter) may be any suitable energy meter that measures the energy generated by the DER 118 (e.g., by the power conditioners 122 coupled to the plurality of RESs 120). The generation meter 154 measures real power flow (kWh) and, in some embodiments, reactive power flow (kVAR). The generation meter 154 may communicate the measured values to the DER controller 116, for example using PLC, other types of wired communications, or wireless communication. Additionally, battery charge/discharge values are received through other networking protocols from the AC battery 130 itself.

The meter 152 may be any suitable energy meter that measures the energy consumed by the microgrid 180, such as a net-metering meter, a bi-directional meter that measures energy imported from the grid 124 and well as energy exported to the grid 124, a dual meter comprising two separate meters for measuring energy ingress and egress, and the like. In some embodiments, the meter 152 comprises the MID 150 or a portion thereof. The meter 152 measures one or more of real power flow (kWh), reactive power flow (kVAR), grid frequency, and grid voltage.

The MID 150, which may also be referred to as an island interconnect device (IID), connects/disconnects the microgrid 180 to/from the grid 124. The MID 150 comprises a disconnect component (e.g., a contactor or the like) for physically connecting/disconnecting the microgrid 180 to/from the grid 124. For example, the DER controller 116 receives information regarding the present state of the system from the power conditioners 122, and also receives the energy consumption values of the microgrid 180 from the meter 152 (for example via one or more of PLC, other types of wired communication, and wireless communication), and based on the received information (inputs), the DER controller 116 determines when to go on-grid or off-grid and instructs the MID 150 accordingly. In some alternative embodiments, the MID 150 comprises an ASIC or CPU, along with suitable software (e.g., an islanding module) for determining when to disconnect from/connect to the grid 124. For example, the MID 150 may monitor the grid 124 and detect a grid fluctuation, disturbance or outage and, as a result, disconnect the microgrid 180 from the grid 124. Once disconnected from the grid 124, the microgrid 180 can continue to generate power as an intentional island without imposing safety risks, for example on any line workers that may be working on the grid 124.

In some alternative embodiments, the MID 150 or a portion of the MID 150 is part of the DER controller 116. For example, the DER controller 116 may comprise a CPU and an islanding module for monitoring the grid 124, detecting grid failures and disturbances, determining when to disconnect from/connect to the grid 124, and driving a disconnect component accordingly, where the disconnect component may be part of the DER controller 116 or, alternatively, separate from the DER controller 116. In some embodiments, the MID 150 may communicate with the DER controller 116 (e.g., using wired techniques such as power line communications, or using wireless communication) for coordinating connection/disconnection to the grid 124.

A user 140 can use one or more computing devices, such as a mobile device 142 (e.g., a smart phone, tablet, or the like) communicably coupled by wireless means to the communications network 126. The mobile device 142 has a CPU, support circuits, and memory, and has one or more applications 146 (e.g., a grid connectivity control application) installed thereon for controlling the connectivity with the grid 124 as described herein. The application 146 may run on commercially available operating systems, such as 10S, ANDROID, and the like.

In order to control connectivity with the grid 124, the user 140 interacts with an icon displayed on the mobile device 142, for example a grid on-off toggle control or slide, which is referred to herein as a toggle button. The toggle button may be presented on one or more status screens pertaining to the microgrid 180, such as a live status screen (not shown), for various validations, checks and alerts. The first time the user 140 interacts with the toggle button, the user 140 is taken to a consent page, such as a grid connectivity consent page, under setting and will be allowed to interact with toggle button only after he/she gives consent.

Once consent is received, the scenarios below, listed in order of priority, will be handled differently. Based on the desired action as entered by the user 140, the corresponding instructions are communicated to the DER controller 116 via the communications network 126 using any suitable protocol, such as HTTP(S), MQTT(S), WebSockets, and the like. The DER controller 116, which may store the received instructions as needed, instructs the MID 150 to connect to or disconnect from the grid 124 as appropriate.

Figure 2:
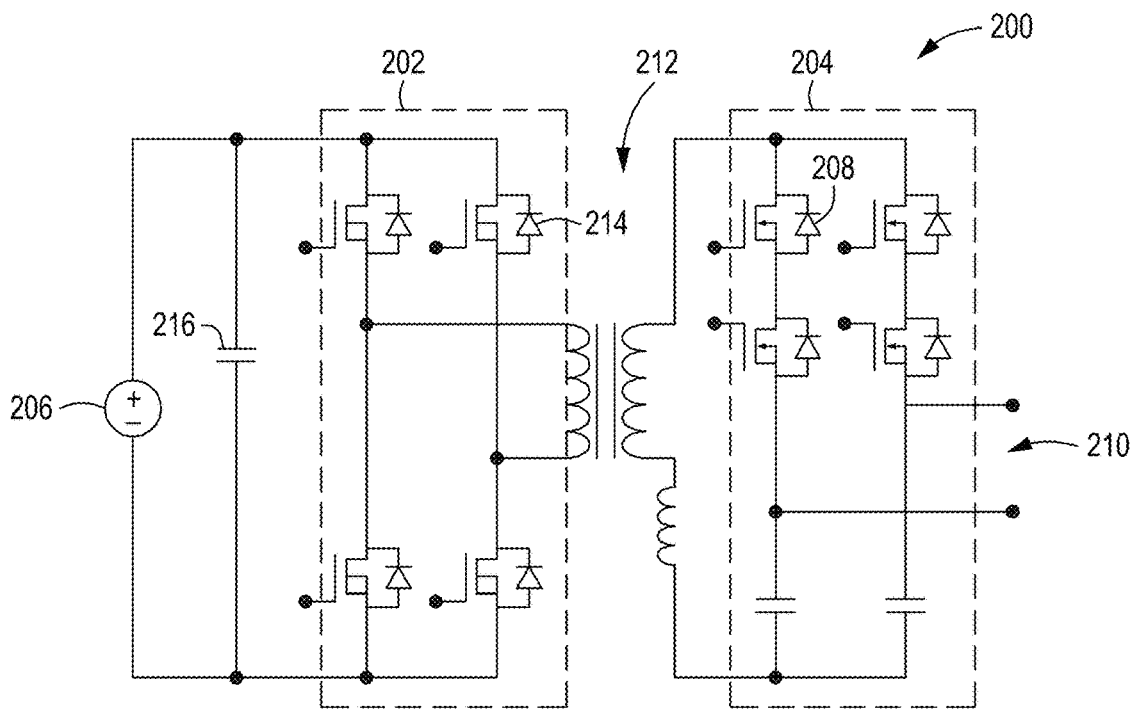
FIG. 2 is a block diagram of a microinverter configured for use with the system of FIG. 1, in accordance with one or more embodiments of the present disclosure.
Figure 4:
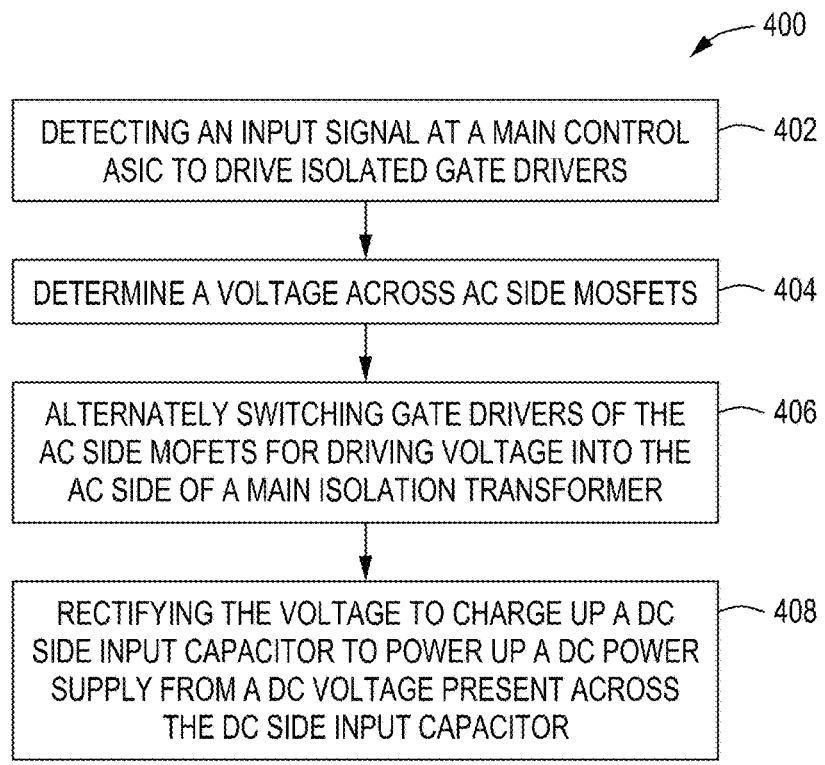
FIG. 4 is a flowchart of a method for providing power to the microinverter of FIG. 2, in accordance with one or more embodiments of the present disclosure.
Figure 3:
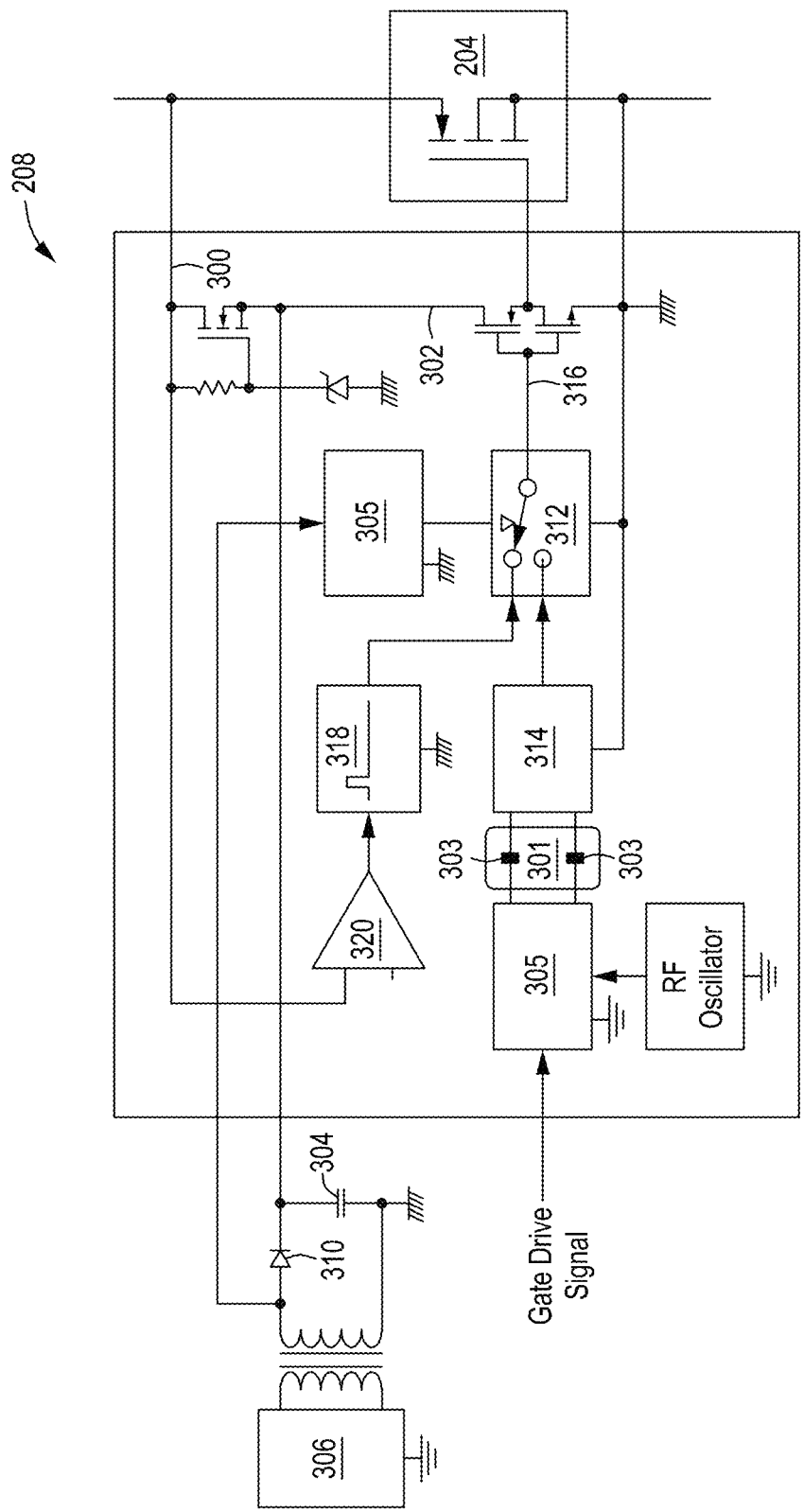
FIG. 3 is a schematic of a gate driver of AC side MOSFETS, in accordance with one or more embodiments of the present disclosure.

FIG. 2 is a block diagram of a microinverter 200 (e.g., power conditioners 122) configured for use with the system 100 of FIG. 1, FIG. 3 is a schematic of a gate driver of AC side MOSFETS, and FIG. 4 is a flowchart of a method for providing power to the microinverter of FIG. 2, in accordance with one or more embodiments of the present disclosure.

The control circuitry that drives DC side MOSFETs 202 (e.g., four DC side MOSFETS on the input side of microinverter) and AC side MOSFETs 204 (four AC side MOSFETs on the output side of microinverter) is powered from a housekeeping power supply that derives power from a DC input 206. The microinverter 200 requires a DC voltage to be applied to the input of the microinverter 200 before the microinverter 200 can start-up. With conventional microinverters, as noted above, however, in a PV application, microinverters shut down during nighttime and start up the following morning when the sun rises and causes the PV module to provide a DC voltage to the input of the microinverter.

The microinverter 200 is bi-directional from a power conversion perspective, i.e., DC→AC and AC→DC, which is central to the microinverter 200 being used in a battery energy storage microinverter. Additionally, the bi-directional functionality of the microinverter 200 allows for PV applications in that the microinverter is able to continue to run once the sun goes down. That is, if the power output from the PV module falls to zero (e.g., at nighttime) the microinverter 200 starts to operate in the AC→DC mode, thus allowing a housekeeping power supply to be powered from power that is derived from the AC side of the microinverter 200. In this way the microinverter 200 is able to run indefinitely during the nighttime.

In accordance with the instant disclosure, isolated gate drivers for the AC side MOSFETs 204 take the form of a gate driver 208 (integrated circuit (IC)) that includes special circuitry and logic to provide a bootstrap start up function. The bootstrap function requires a number of specific logical steps to be performed in a sequence so that the microinverter 200 is able to start up with no DC input applied to the microinverter (i.e., only AC voltage present). In at least some embodiments, the sequence is based on a double bootstrap concept. For example, in an embodiment, a first bootstrap concept can be used to power up the gate drivers 208 of the AC side MOSFETs 204, which, in turn, run in a special start up mode that acts on a second bootstrap concept to start up the microinverter 200.

For example, as illustrated in FIG. 3, the gate driver 208 uses a semiconductor based isolation barrier 301 comprising a differential pair of capacitors 303 to isolate a modulation signal from a modulator 305 across the semiconductor based isolation barrier 301. In at least some embodiments, the gate driver 208 may also comprise or use structure that is configured to perform one or more other/different isolation methods which can include coreless transformer isolation, magnetic isolation, optical isolation, and so on.

The gate driver 208 can comprise or connect to a high-voltage bootstrap MOSFET (e.g., the AC side MOSFETs 204, one of which is shown in FIG. 3) that connects between a drain 302 & $V_{dd}$ connections of the gate driver 208 and is responsible for bootstrap charging of a gate driver power supply capacitor 304 when a gate driver power supply oscillator 306 is not operational, e.g., when a DC input power is not available to the microinverter 200.

The gate driver 208 comprises mode detection logic 308 that connects to a diode input 310 of the gate driver 208 and determines if the gate driver power supply oscillator 306 is operational. For example, a presence of a high frequency signal (e.g., about 10 MHz to about 100 MHz) at the diode input 310 indicates that the gate driver power supply oscillator 306 is operational (i.e., DC input power is available to the microinverter 200), whereas an absence of any high frequency signal at the diode input 310 would indicate that the gate driver power supply oscillator 306 is not operational (i.e., DC input power is not available to the microinverter 200).

The gate driver 208 comprises a multiplexer 312 controlled by the mode detection logic 308. For example, if DC input power is available to the input of the microinverter 200, the multiplexer 312 connects the output of a demodulator 314 to a gate drive output buffer stage 316 resulting in the gate driver 208 operating in a conventional isolated gate driver fashion (e.g., a first mode of operation). Conversely, if DC input power is not available to the input of the microinverter 200, the multiplexer 312 connects the output of a monostable oscillator 318 to the gate drive output buffer stage 316 resulting in the gate driver 208 operating in the bootstrap start-up mode of operation (e.g., a second mode of operation different from the first mode of operation), as described in greater detail below.

The gate driver 208 comprises a voltage comparator 320 that is configured to determine if a drain-to-source voltage across the main power MOSFET (e.g., the AC side MOSFETs 204 is above or below 250 Vdc. Thus, when the gate driver 208 turns on the main power MOSFET connected thereto, then the voltage comparator 320 expects that the drain-to-source voltage across the main power MOSFET will fall to approximately zero voltage. Accordingly, assuming the microinverter 200 is powered of 240 Vac, which has a peak voltage of 340 Vdc, the maximum voltage across the main power MOSFET would be approximately 170 Vdc (i.e., half the peak AC main voltage) if another of the complementary main power MOSFETs is turned on. Therefore, a voltage across the main power MOSFET exceeding 250 Vdc is a way for this gate driver 208 knowing that the complimentary main power MOSFET is turned on.

The monostable oscillator 318 generates a short duration gate drive signal (e.g., a predetermined value of about 1 μs long gate-on signal) when triggered by the voltage comparator 320 detecting a drain-to-source voltage in excess of a predetermined threshold (e.g., 250 Vdc). In at least some embodiments, the monostable oscillator 318 output signal can be delayed with respect to receiving the input signal from the voltage comparator 320 and once the monostable oscillator 318 has produced a single gate output on signal pulse (e.g., a 1 µs gate-on pulse), the monostable oscillator 318 imposes a blanking period (e.g., about 10 µs) in which time the monostable oscillator 318 will not produce another gate output signal.

Continuing with reference to FIGS. 2-4, a full bootstrap start-up sequence (e.g., the first bootstrap concept and the second bootstrap concept) can comprise one or more high-voltage MOSFETs that can be added to the power circuit of the microinverter 200 and used as linear voltage regulators to directly derive current from an AC port 210 of the microinverter 200 and power up output stages of the isolated the gate drivers 208 of the AC side MOSFETs 204. During a linear mode of operation (e.g., during a bootstrap period), an efficiency of the voltage regulator is relatively low (e.g. 2% efficiency), however, when the microinverter 200 is finally powered up, the AC side MOSFETs 204 are no longer operated as a linear regulators, thus allowing for a higher efficiency, normal power supply to power the gate drivers 208.

At 402, the method 400 comprises detecting an input signal at a main control ASIC to drive the isolated the gate drivers 208. For example, the output stages of the gate drivers 208 of the AC side MOSFETs 204 (with bootstrap start-up logic) are powered up and logic in the output stage is configured to determine if the input stages to the isolated the gate drivers 208 are not powered up (e.g., if there is no input signal being provided to the main control ASIC to drive the isolated the gate drivers 208). The gate driver output stage logic interprets the no signal condition as a start-up condition, which requires the gate drivers 208 to generate valid gate drive signals to bootstrap the microinverter 200.

Next, at 404, the method 400 comprises determining a voltage across AC side MOSFETs. For example, the output stages of the gate drivers 208 (with bootstrap start-up logic) includes circuitry which allows the gate drivers 208 to determine a voltage across the AC side MOSFETs 204. In at least some embodiments, the circuitry can be based on a voltage comparator set to a voltage of about 250 V. If the output stage of the gate drivers 208 detects that the start-up condition is present and the voltage across the AC side MOSFETs 204, to which the output stage is connected, is above 250 V, the output stage generates a short duration (e.g. about 1 µs) high output to momentarily turn the AC side MOSFETs 204 on. In at least some embodiments, once the gate drivers 208 have provided the 1 µs signal to turn on the AC side MOSFETs 204, a blanking period of about 10 µs can be applied during which time the gate drivers 208 are not allowed to turn on irrespective of the voltage across the AC side MOSFETs 204.

Next, at 406, the method 400 comprises alternately switching gate drivers of the AC side MOSFETs for driving a voltage into the AC side of a main isolation transformer. For example, the inventors have found that an effect of the above start-up logic being implemented in all of the output stages of the isolated gate drivers 208 results in the gate drivers 208 alternately switching at a frequency of about 100 kHz. The exact frequency that such switching occurs can be adjusted by degerming the blanking period applied in the gate drivers 208 start-up logic. The alternate of the gate drivers 208 switching drives a voltage into the AC side of a main isolation transformer 212, which, in turn drives a voltage to be generated across the DC side winding of the main isolation transformer 212.

Next, at 408, the method 400 comprises rectifying the voltage to charge up a DC side input capacitor to power up a DC power supply from a DC voltage present across a DC side input capacitor. For example, the 100 kHz voltage generated across the DC side of the main isolation transformer 212 can be rectified by the body-diodes 214 of the DC side MOSFETs 202. The body-diodes 214 of the DC side MOSFETs 202 rectify the 100 kHz voltage and charge up a DC side input capacitor 216. The housekeeping power supply is powered up from the DC voltage present across the DC side input capacitor 216. Moreover, the main control ASIC can be powered up and the main control ASIC generates gate drivers 208 signals (valid gate drivers signals) to drive both the DC side MOSFETs 202 and AC side MOSFETs 204. In at least some embodiments, during 408, the method 400 can comprise isolating a modulation signal from the modulator 305 disposed across the semiconductor based isolation barrier 301.

The output stages of the gate drivers 208 (with bootstrap start-up logic) determines if the input stages to the gate drivers 208 are now powered up (i.e., if there is an input signal provided by the main control ASIC to drive the isolated gate drivers 208). The gate drivers 208 output stage logic interprets such a condition as the end of the start-up condition and the start-up logic is disabled leaving the main control ASIC responsible for generating gate drivers 208 (valid gate drivers) to run the microinverter 200 in the normal operational mode.

With the housekeeping power supply up and operational and the main control ASIC providing the gate drivers 208 signals, the gate drivers 208 are provided with the normal auxiliary power supply. The DC side MOSFETs 202 and the AC side MOSFETs 204 (e.g., high voltage) used as linear regulators to bootstrap power up the gate drivers 208 are now deactivated, i.e., they now longer function as linear regulators.

While the foregoing is directed to embodiments of the present disclosure, other and further embodiments of the disclosure may be devised without departing from the basic scope thereof, and the scope thereof is determined by the claims that follow.

What is claimed is:
1. A microinverter, comprising:
DC side MOSFETs connected to an input side of the microinverter;
AC side MOSFETs connected to an output of the microinverter; and
a plurality of gate drivers connected to the AC side MOSFETs and configured to automatically drive the microinverter without a DC voltage being applied to the input side of the microinverter;
wherein each of the AC side MOSFETs is connected to one of the plurality of gate drivers, and each of the plurality of gate drivers comprises circuitry and logic to provide a bootstrap start up function.
2. The microinverter of claim 1, wherein the input side comprises four DC side MOSFETs, and the output side comprises four AC side MOSFETs.
3. The microinverter of claim 1, wherein the microinverter is bi-directional such that when a power output from a PV module connected to the microinverter falls to zero, the microinverter is configured to start to operate in an AC→DC mode to allow a housekeeping power supply to be powered from power that is derived from the AC side of the microinverter.

4. The microinverter of claim 1 wherein the gate driver further comprises a semiconductor based isolation barrier comprising a differential pair of capacitors that are configured to isolate a modulation signal from a modulator disposed across the semiconductor based isolation barrier.

5. The microinverter of claim 1, wherein the gate driver further comprises structure that is configured to at least one of perform a coreless transformer isolation, magnetic isolation, or optical isolation.

6. The microinverter of claim 1, wherein each of the AC side MOSFETs connects to a drain and $V_{dd}$ connections of the gate driver for bootstrap charging of a gate driver power supply capacitor when a gate driver power supply oscillator is not operational.

7. The microinverter of claim 1, wherein the gate driver further comprises mode detection logic that connects to a diode input of the gate driver for determining when the gate driver power supply oscillator is operational.

8. The microinverter of claim 7, wherein the diode input is configured such that a presence of a signal indicates that the gate driver power supply oscillator is operational and an absence of the signal indicates that the gate driver power supply oscillator is not operational.

9. The microinverter of claim 7, wherein the gate driver further comprises a multiplexer controlled by the mode detection logic.

10. The microinverter of claim 9, wherein the multiplexer is configured such that when DC input power is available to the input of the microinverter, the multiplexer connects an output of a demodulator to a gate drive output buffer stage so that the gate driver can operate in a first mode of operation, and when DC input power is not available to the input of the microinverter, the multiplexer connects the output of a monostable oscillator to the gate drive output buffer stage so that the gate driver can operate in a second mode of operation different from the first mode of operation.

11. The microinverter of claim 10, wherein the gate driver further comprises a voltage comparator that is configured to determine when a drain-to-source voltage across the AC side MOSFETS is at a predetermined threshold.

12. The microinverter of claim 11, wherein the predetermined threshold is about 250 Vdc.

13. The microinverter of claim 12, wherein the monostable oscillator is configured to generate a gate drive signal when triggered by the voltage comparator detecting a drain-to-source voltage in excess of the predetermined value.

14. The microinverter of claim 12, wherein the gate drive signal has a duration or about 1 µs.

* * * * *